(12) United States Patent
Kellam (10) Patent No.: US 8,328,427 B2
(45) Date of Patent: Dec. 11, 2012

(54) SLIDING STRUT BEARING

(75) Inventor: David M. Kellam, Stratford (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 472 days.

(21) Appl. No.: 12/539,946

(22) Filed: Aug. 12, 2009

(65) Prior Publication Data

US 2010/0040317 A1 Feb. 18, 2010

Related U.S. Application Data (60) Provisional application No. 61/088,633, filed on Aug. 13, 2008.

(51) Int. Cl.
*F16C 17/04* (2006.01)
*F16C 33/74* (2006.01)

(52) U.S. Cl. ........................................ 384/420; 384/144

(58) Field of Classification Search ................... 384/125, 384/143, 144, 228, 275, 296, 297, 300, 303, 384/420–427; 280/124.145, 124.147, 124.155; 267/220
See application file for complete search history.

(56) References Cited

U.S. PATENT DOCUMENTS

| | | | |
|---|---|---|---|
| 4,969,752 A | 11/1990 | Kubota et al. | |
| 5,476,326 A | 12/1995 | Ueno et al. | |
| 6,918,701 B2 | 7/2005 | Ueno et al. | |
| 8,016,489 B2 | 9/2011 | Kaneko et al. | |
| 2004/0028303 A1* | 2/2004 | Ueno et al. | 384/276 |
| 2004/0240761 A1* | 12/2004 | Watai et al. | 384/420 |
| 2006/0140523 A1* | 6/2006 | Miyata et al. | 384/420 |
| 2006/0215944 A1* | 9/2006 | Watai et al. | 384/420 |
| 2007/0212198 A1 | 9/2007 | Cordivari et al. | |

FOREIGN PATENT DOCUMENTS

| | | |
|---|---|---|
| JP | 2001027229 A | 1/2001 |
| JP | 2004263773 A | 9/2004 |
| JP | 2007303643 A | 11/2007 |

* cited by examiner

*Primary Examiner* — Thomas R Hannon
*Assistant Examiner* — Phillip A Johnson
(74) *Attorney, Agent, or Firm* — Lucas & Mercanti, LLP; Klaus P. Stoffel (57) ABSTRACT

The sliding strut bearing has two rigid body positioned in a plastic housing and a synthetic resin sliding bearing positioned between the two rigid bodies. The rigid bodies are metal and provide structural rigidity allowing a spring seat to be incorporated into the plastic housing and an overall reduction in the height of the bearing.

15 Claims, 9 Drawing Sheets

SLIDING STRUT BEARING

This application claims the priority of U.S. 61/088,633 filed Aug. 13, 2008, which is incorporated by reference herein.

FIELD OF THE INVENTION

The present Invention relates to synthetic resin made sliding bearings and, more particularly, to synthetic resin sliding bearings which are suitable for use in strut-type suspensions (MacPhearson-type).

BACKGROUND OF THE INVENTION

MacPhearson-style strut assemblies are well known in the automotive industry. Such assemblies typically comprise a strut which extends upward from the steering knuckle of the wheel and terminates in a top mount which is attached to the chaise of the vehicle. The strut has a rod with a hydraulic cylinder and a spring for absorbing movement of the wheel. The joint between the top mount and the strut contains a strut bearing. A metal spring seat is attached below the bearing and around the rod to terminate and support one end of the spring. A jounce bumper to prevent coil-on-coil compression of spring is mounted also below the bearing and around the rod at the top mount. The strut bearing typically comprises roller bodies or, a synthetic resin sliding bearing.

Figure 1:
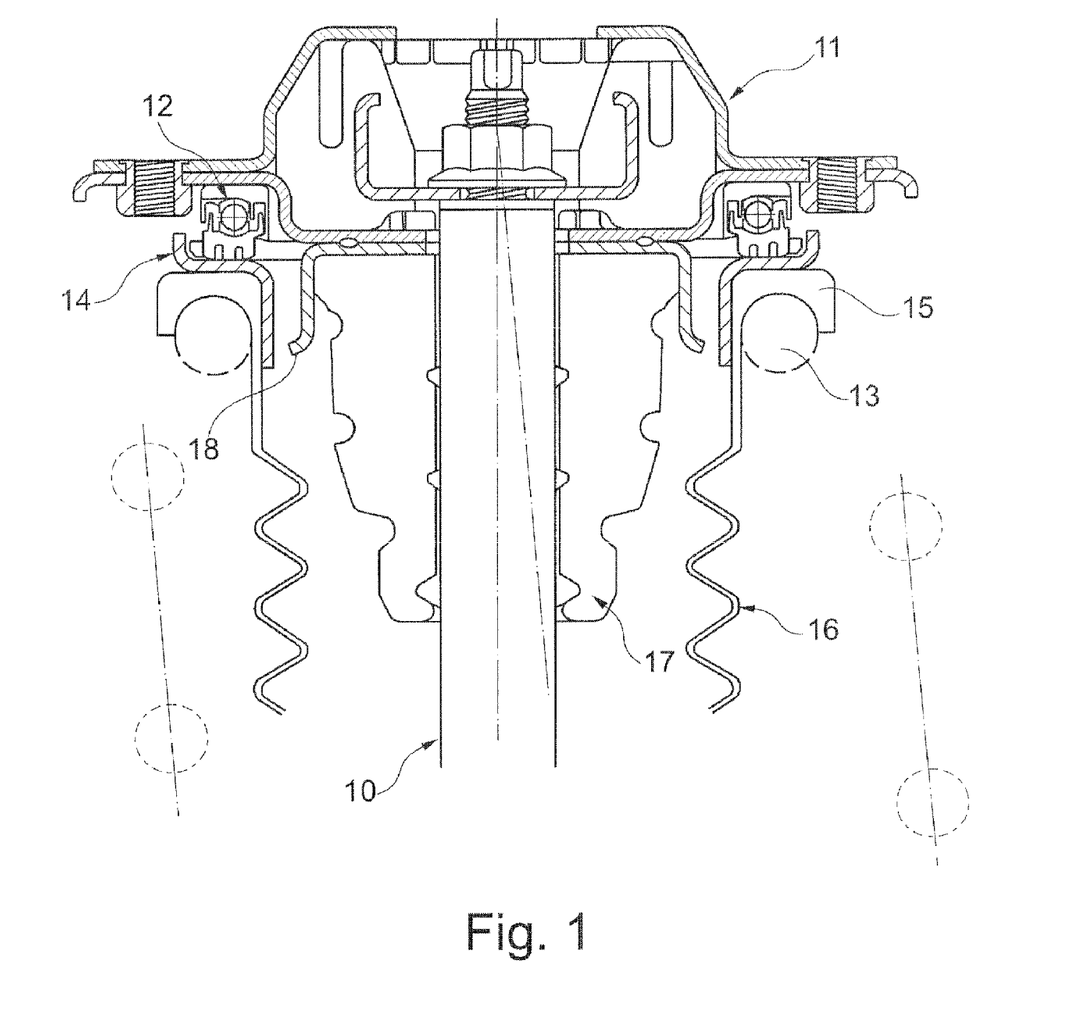
FIG. 1 illustrates a conventional MacPherson strut assembly.

A typical MacPherson strut assembly is illustrated in FIG. 1. Rod 10 terminates at top mount 11. Between rod 10 and top mount 11 is strut bearing 12 with roller bodies. Spring 13 is housed in spring seat 14 which is conventionally a metal frame. Between spring 13 and spring seat 14, is rubber isolator 15, dust boot 16 extends downward from rubber isolator 15 and jounce bumper 17 is mounted on rod 10 in jounce bumper support cup 18.

There is a need to reduce the overall height of the strut bearing. One way to reduce the height of strut bearing 12, is to use a strut bearing with synthetic resin sliding bearing, see, for example, U.S. Pat. Nos. 4,969,752, 5,476,326, and 6,918,701. One of the drawbacks of these synthetic resins sliding bearing is that, a metal spring seat is needed between the bearing and the spring.

OBJECTS OF THE INVENTION

It is an object of the present Invention to reduce the overall height of the strut bearing. It is also the object of the Invention to control the torque of the bearing.

These and other objects of the present Invention will be more readily understood by reference to the following description.

SUMMARY OF THE INVENTION

The present Invention obtains the objectives by a synthetic resin sliding bearing position between rigid bodies which are then positioned in a plastic housing to form the strut bearing.

This arrangement of the strut bearing allows for a decrease in the overall height of the bearing due to the elimination of the roller elements and the metal spring seat. It also allows the spring to be seated directly against the lower end of plastic housing. Torque selection is provided by the bearing of the present Invention because of the use of the rigid bodies inside the housing of the bearing. Furthermore, because of the placement of the synthetic resin sliding bearing between the two rigid bodies, the outside plastic housings can be made of a wide variety of different materials thereby eliminating the need for the upper and lower housing to be made specifically of a synthetic resin sliding material. Specifically, the housing can be made of thermoplastic materials with or without glass stiffening materials.

Broadly, the sliding strut bearing of the present Invention can be defined as follows:

a plastic housing which has a through hole for accommodating a rod of a strut, the housing having an inner wall which defines the through hole and encircles the rod;

a flanged, cylindrical annulus in the housing, the annulus having a cylindrical hollow axially aligned with the through hole and a thrust hollow extending radially outward from the cylindrical hollow, the thrust hollow in a flanged portion of the annulus, the cylindrical hollow having an inside and outside inner wall which are axially aligned with the through hole, the thrust hollow having a top inner wall that extends radially outward from the inside inner wall and a bottom inner wall that extends radially outward from the outside inner wall;

an inner rigid body abutting the inside and top inner wall;
an outer rigid body abutting the outside and bottom inner wall; and
a synthetic resin sliding bearing body positioned between the inner and outer rigid body.

Preferably, the housing comprises:

an upper plastic housing having an inner plastic sleeve for encircling the rod and an upper plastic ledge affixed to and extending radially outward from the inner plastic sleeve;

a lower plastic housing mating, from below with the upper plastic housing and having an outer plastic sleeve spaced apart and encircling the inner plastic sleeve and a lower plastic ledge affixed to and extending from the outer plastic sleeve, the lower plastic ledge spaced apart from the upper plastic ledge;

a bottom seal formed between a bottom axial edge of the inner plastic sleeve and a bottom axial edge of the outer plastic sleeve;

a top seal formed between an outer radial edge of the upper plastic ledge and an outer radial edge of the lower plastic ledge;

the cylindrical hollow is formed between the inner plastic sleeve and the outer plastic sleeve;

the thrust hollow is formed between the upper plastic ledge and the lower plastic ledge.

Preferably, the inner rigid body is an inner sleeve in the cylindrical hollow, abutting the inside inner wall and axially aligned with the through hole and an upper thrust washer in the thrust hollow abutting the top inner wall, and axially aligned with the through hole. The washer and the sleeve can be separate or can be joined to form a unitary body having an L-cross sectional appearance.

Preferably, the outer rigid body is an outer sleeve in the cylindrical hollow, abutting the outside inner wall and axially aligned with the through hole and a lower thrust washer in the thrust hollow abutting the bottom inner wall and axially aligned with the through hole. The sleeve and thrust washer can be separate from one another or can be joined to form a unitary body having an L-shaped cross section.

Preferably, the inner and the outer rigid body are made of a hard plastic, ceramic or metal. Suitable metals include steel, aluminum or brass.

Suitable steel includes hardened and non-hardened carbon or stainless steel.

Suitable aluminum includes pure aluminum or alloys of aluminum that include copper, zinc or magnesium.

Suitable brass includes alloys of copper and zinc in different proportions.

Suitable ceramics include cement or a combination of metal and ceramic.

Preferably, the synthetic resin sliding bearing body comprises a synthetic resin sliding sleeve positioned between the inner and outer sleeves and a synthetic resin sliding thrust washer positioned between the upper and lower thrust washers. The sliding sleeve can be separate from the sliding thrust washer or the two can be joined to form a solitary unit. The synthetic resin which is used for forming the sliding bearing is suitably self lubricating. Suitable materials for the sliding bearing include polyacetal resins, polyamide resins, polyester resins, such as, polybutyl terephthalate (PBT) and polyolefin resins, such as, polyethylene and polypropylene. More preferably, the resin is a fluoropolymer, such as, polytetrafluoroethylene (PTFE). The sliding bearing is suitably affixed to one of the rigid body by any conventional means to include adhesives, such as, ethylenetetrafluoroethylene (ETFE). This makes a composite material. One well known composite material that can be used for the bearing of the present Invention is sold under the trademark NORGLIDE® which is available from Saint-Gobain Performance Plastics Corp. of Wayne, N.J., U.S.A. A method to make such a composite material is taught in U.S. Publication No. US2007/0212198.

Suitably, the housing and more specifically, the lower plastic housing has a spring seat on an outer wall.

More preferably, the housing and more specifically the lower plastic housing has a jounce bumper support cup which is affixed to and extends axially downward from the bottom of the axial edge of the housing.

These and other aspects of the present Invention may be more readily understood by reference to one or more of the following drawings.

DETAILED DESCRIPTION OF THE INVENTION

Figure 2:
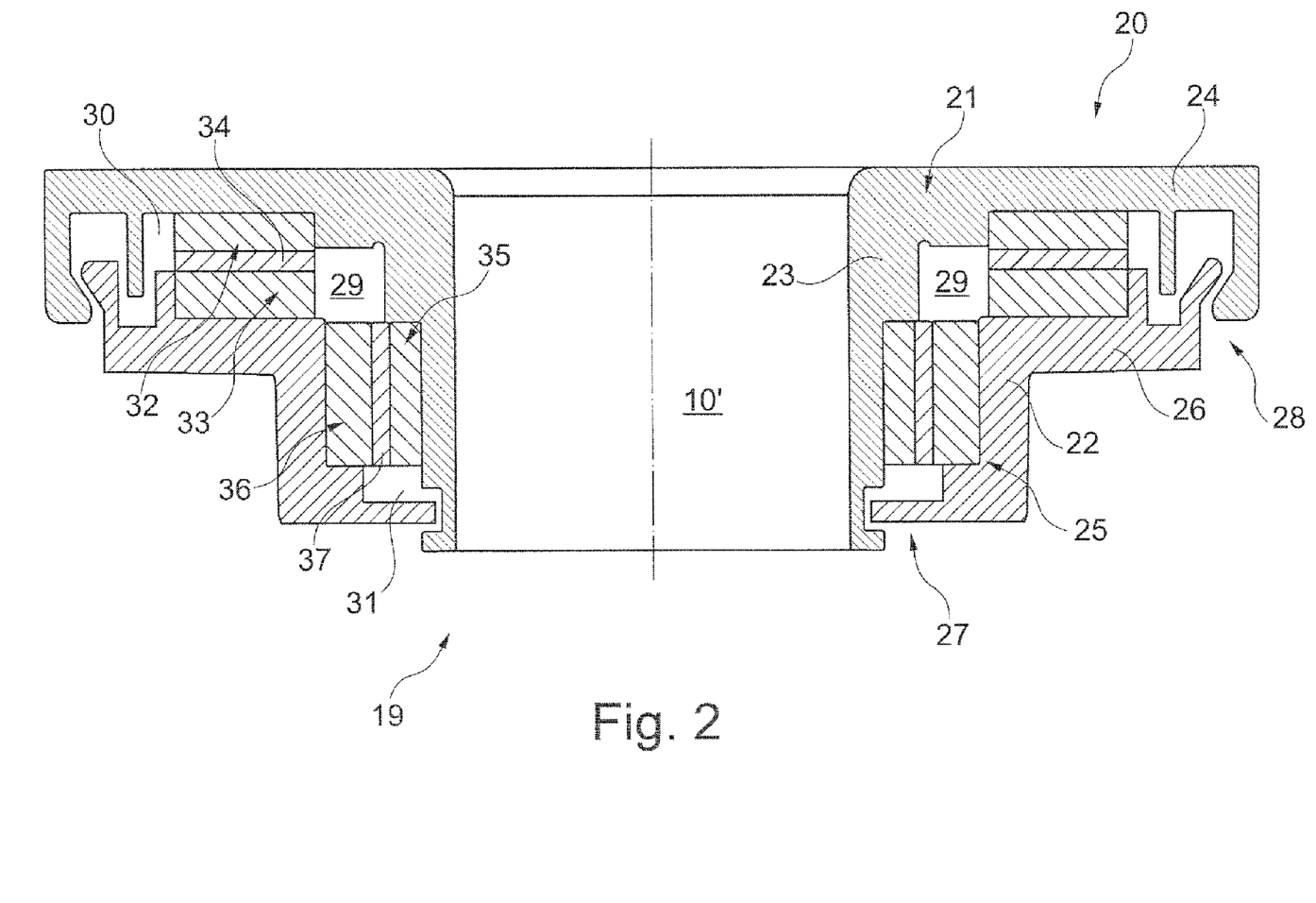
FIG. 2 illustrates the strut of the present Invention with separate thrust washers and separate sleeves.

As shown in FIG. 2, sliding strut bearing 19 has plastic housing 20 with through hole 10'. Plastic housing 20 has upper plastic housing 21, lower plastic housing 22. Upper plastic housing being superimposed on lower plastic housing 22 so as to mate the two housings together. Upper plastic housing 21 has inner plastic sleeve 23 for encircling rod 10 and upper plastic ledge 24 which extends radially outward from sleeve 23.

Lower plastic housing 22 has outer plastic sleeve 25 and lower plastic ledge 26 which extends radially outward from the top of outer plastic sleeve 25. A bottom seal 27 is formed at the bottom axial edge of inner plastic sleeve 23 and outer plastic sleeve 25. Top seal 28 is formed at the outer radial edges of upper plastic ledge 24 and lower plastic ledge 26.

Between housing 21 and housing 22 is a flanged, cylindrical annulus 29. Flanged, cylindrical annulus 29 is made up of thrust hollow 30 and cylindrical hollow 31.

Thrust hollow 30 houses upper thrust washer 32, lower thrust washer 33 and synthetic resin sliding thrust washer 34.

Cylindrical hollow 31 houses inner sleeve 35, outer sleeve 36 and synthetic resin sleeve 37. As can be seen in FIG. 2, the sleeves 35, 36 are separate from the thrust washers 32, 33.

Inner rigid body is made up of upper thrust washer 32 and inner sleeve 35.

Outer rigid body is made up of lower thrust washer 33 and outer sleeve 36.

Figure 3:
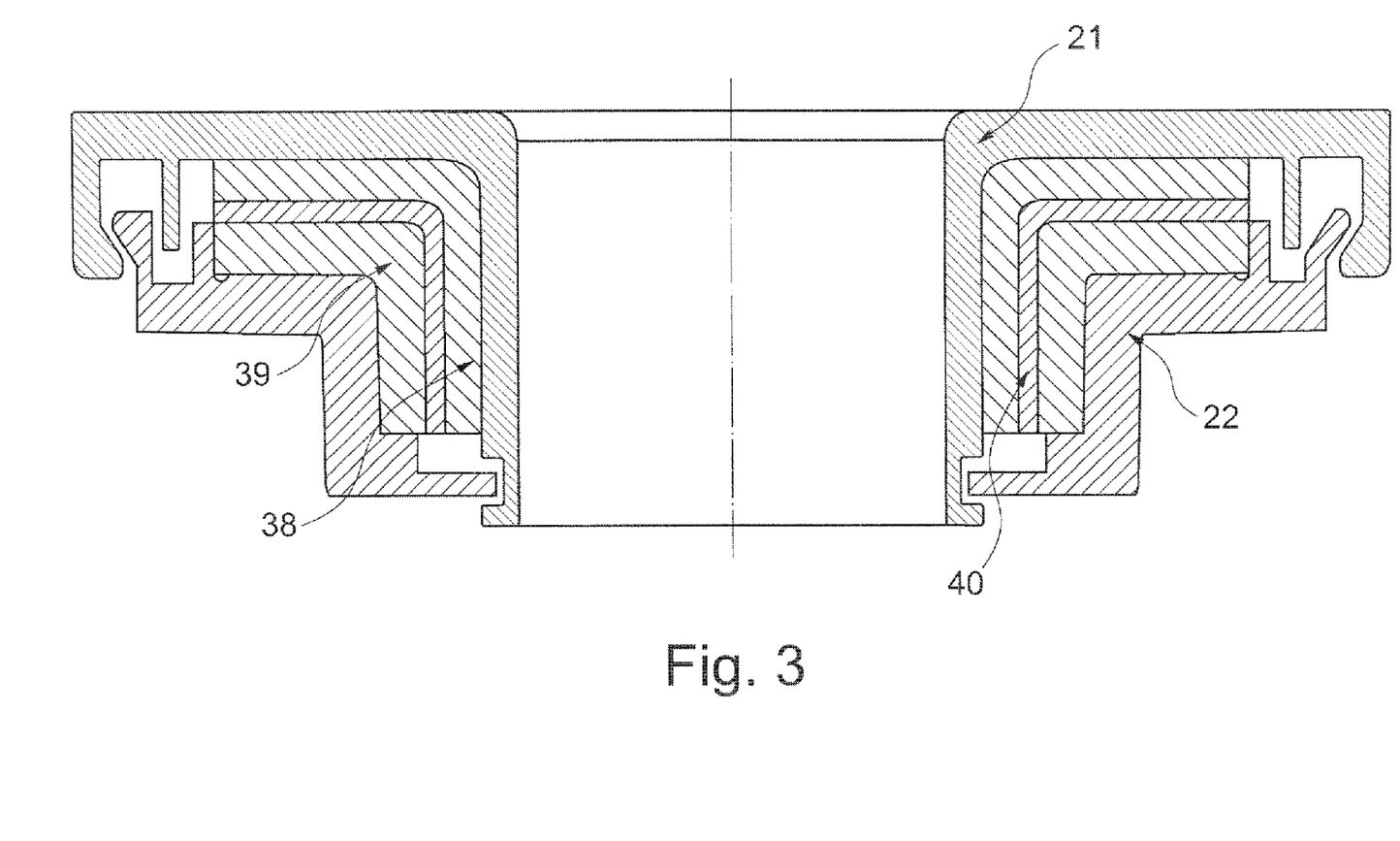
FIG. 3 illustrates the present Invention with unitary rigid bodies and unitary sliding bearing.

Turning to FIG. 3, it can be seen that the thrust washer 32 and sleeve 31 are combined into a unitary body inner flanged sleeve 38 and thrust washer 33 and metal sleeve 36 form a unitary body, outer flanged sleeve 39. Also, it can be seen that sliding sleeve and the sliding thrust washer are combined to a single resin flanged sleeve 40.

Figure 4:
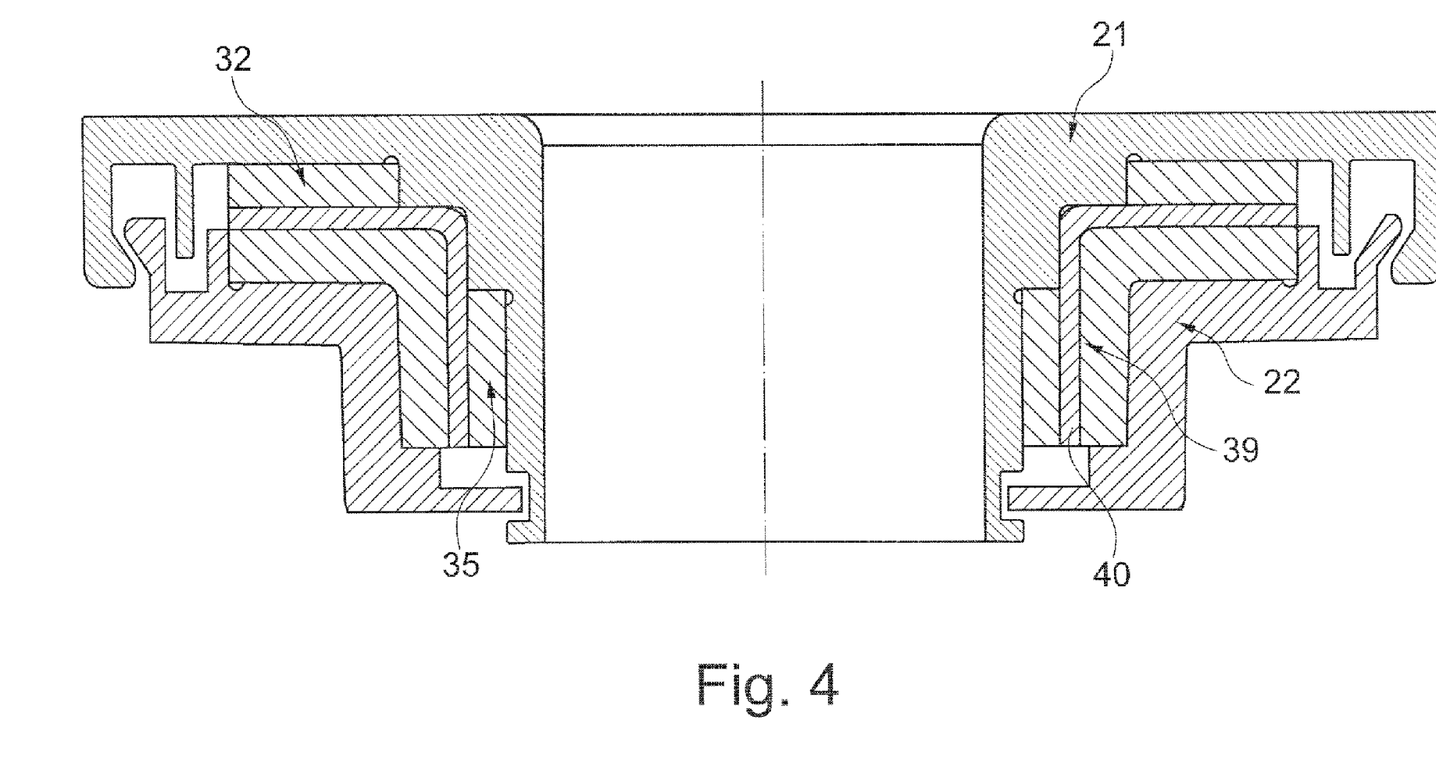
FIG. 4 illustrates the present Invention with a unitary outer rigid body, unitary sliding bearing and separate inner rigid bodies.
Figure 5:
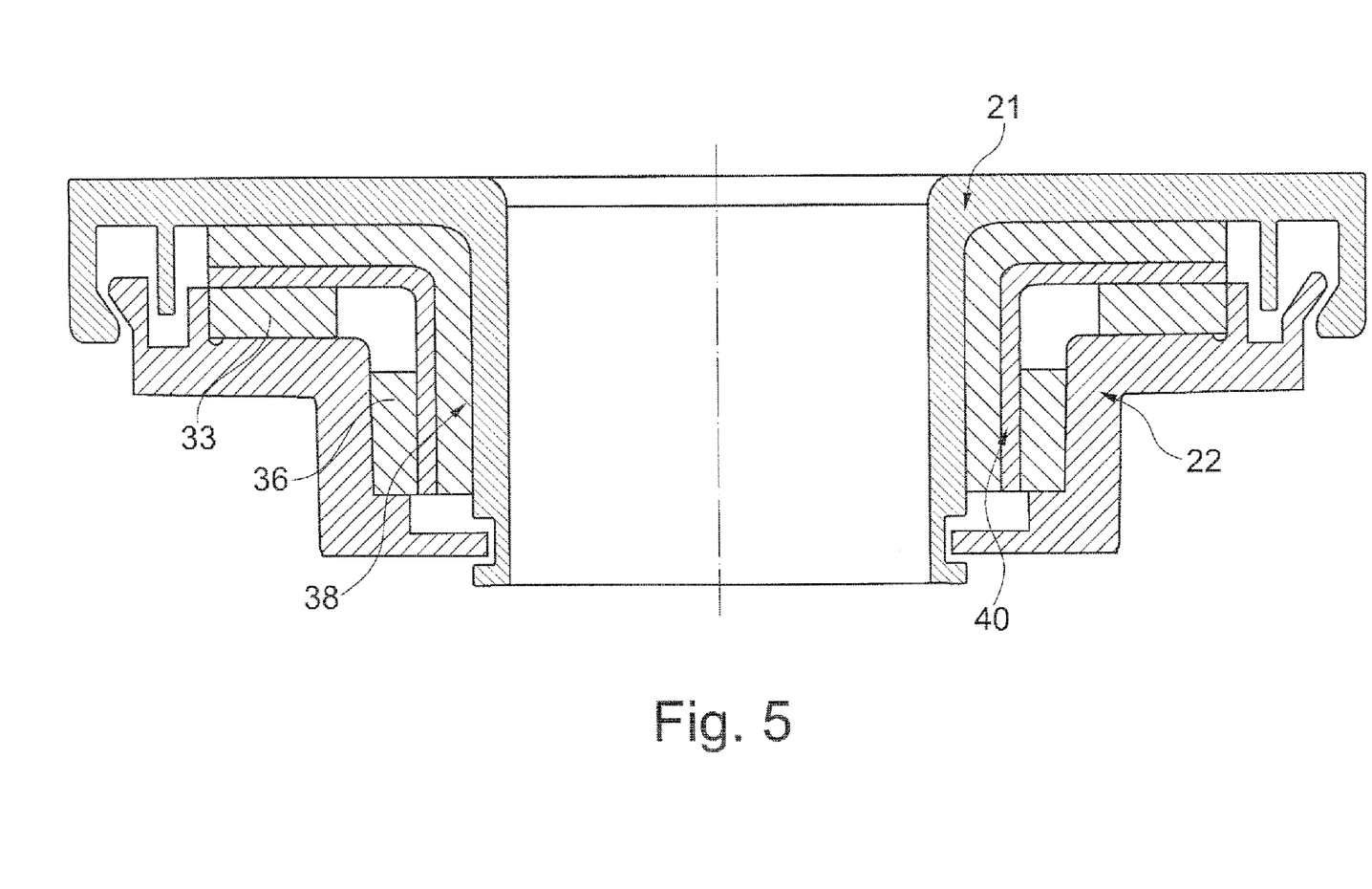
FIG. 5 illustrates the present Invention with a unitary inner rigid body, separate outer rigid bodies and a unitary sliding bearing.

FIGS. 4 and 5 illustrate combinations of the flanged sleeves, thrust washer and sleeve combinations.

Figure 6:
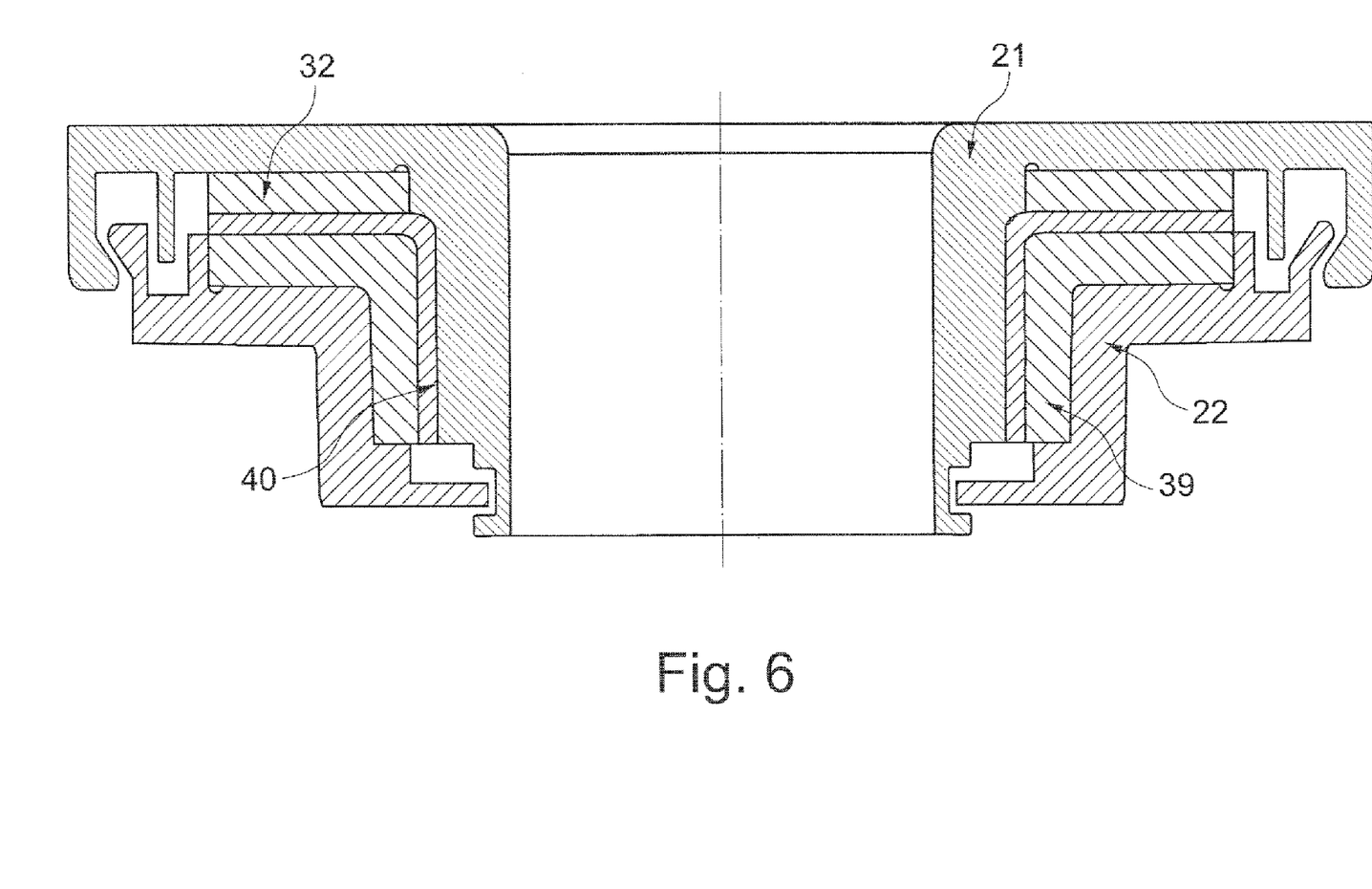
FIG. 6 illustrates the present Invention with unitary outer rigid body, a single thrust inner washer and a unitary sliding bearing.

FIG. 6 illustrates the embodiment where the inner rigid body has only a thrust washer and no inner sleeve.

Figure 7:
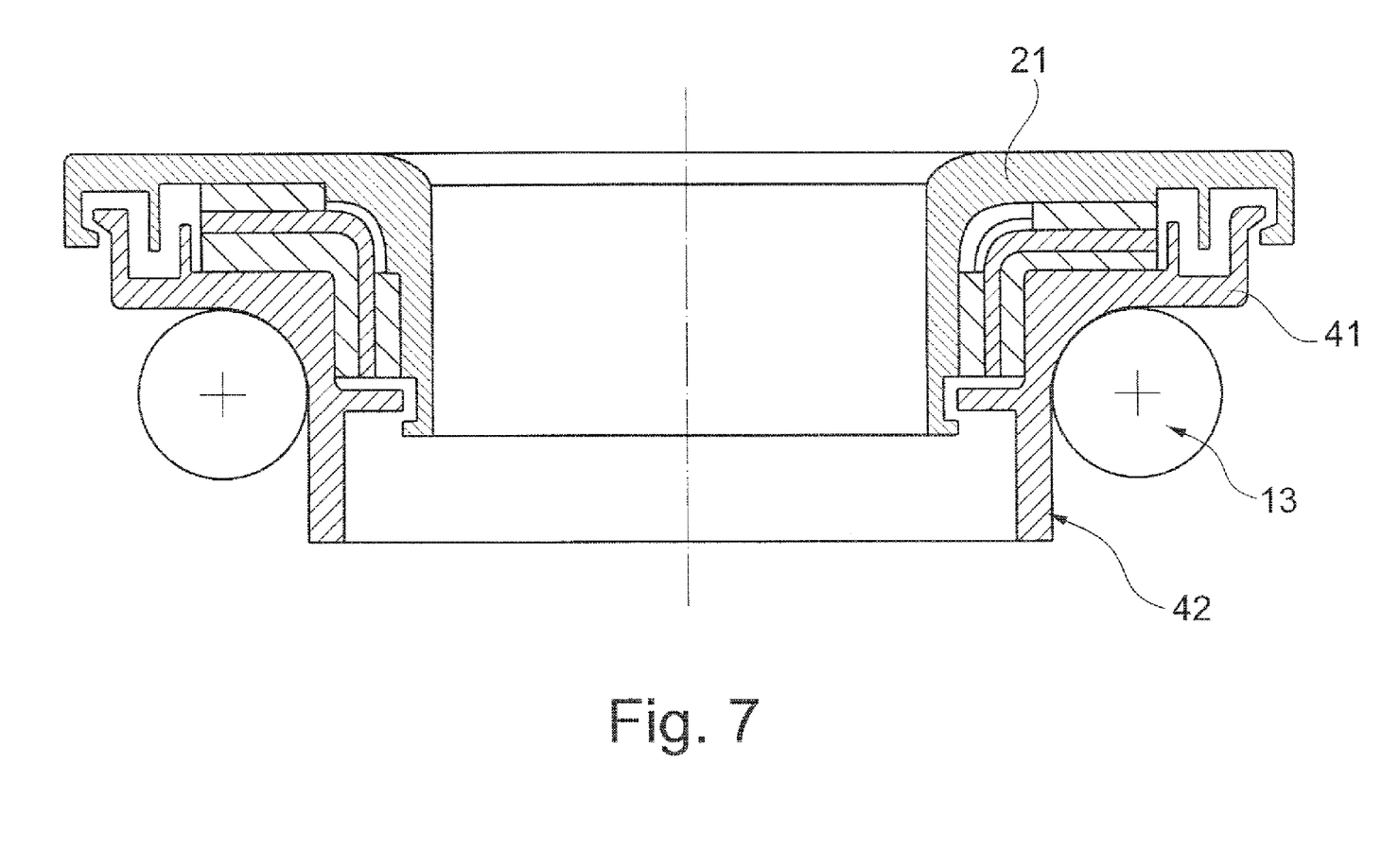
FIG. 7 illustrates the present Invention with lower plastic housing acting as a spring seat.

Turning to FIG. 7, lower plastic housing 41 has spring seat 42 for spring 13.

Figure 8:
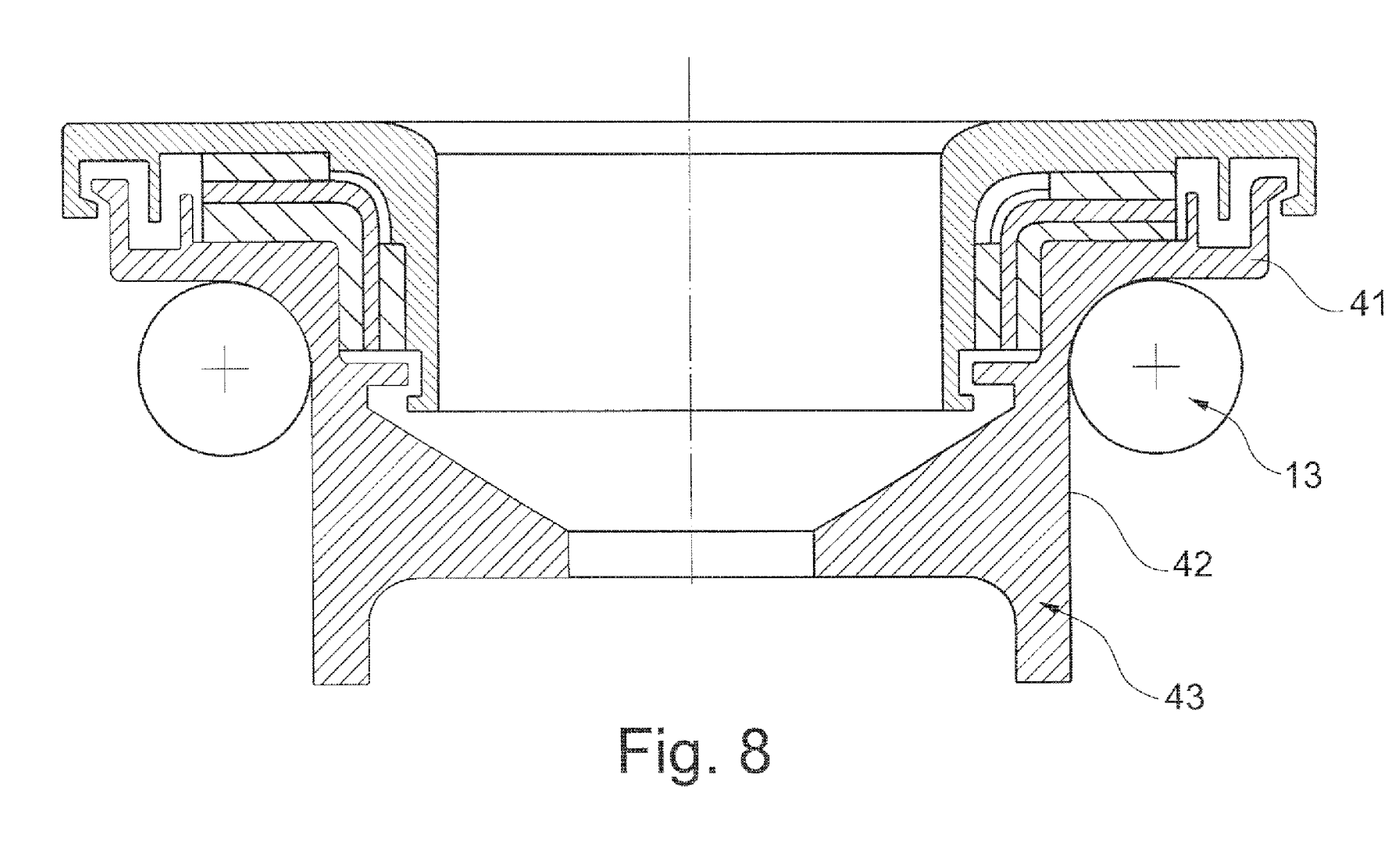
FIG. 8 illustrates the present Invention with lower plastic housing acting as both a spring seat and jounce bumper support cup.

FIG. 8 illustrates lower plastic housing 41 with spring seat 42 and an integrated jounce bumper support cup 43.

Figure 9:
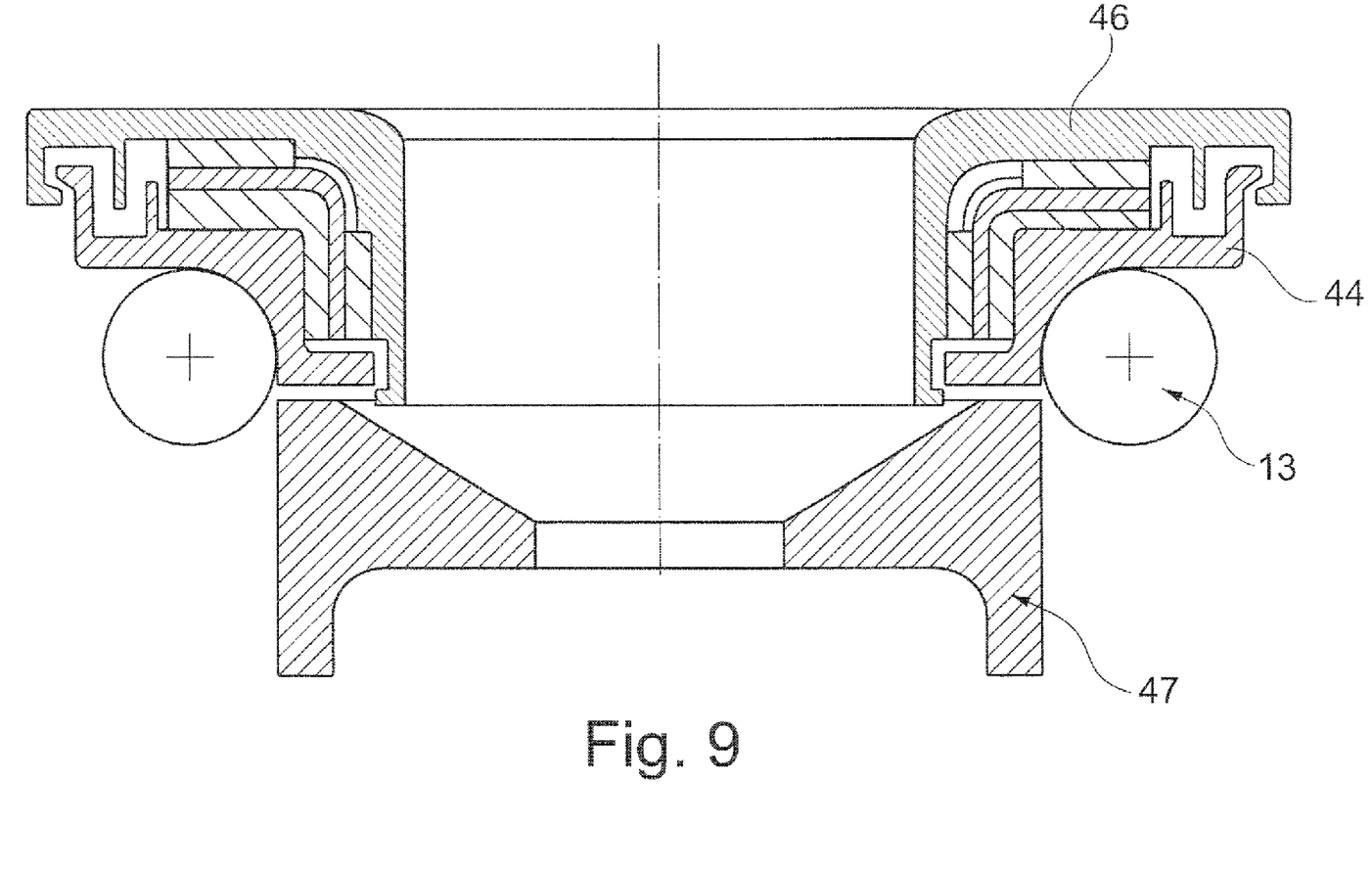
FIG. 9 illustrates the present Invention with the upper housing having jounce bumper support cup and the lower housing having a spring seat.

FIG. 9 illustrates lower plastic housing 44 with spring seat 45 for spring 13 and upper housing 46 with integrated jounce bumper support cup 47.

The plastic housings can be made of thermoplastic materials such as PA 66, POM, PBT with or without stiffening agents such as glass fibers.

The seals for locking two ends of the housings together can be any conventional locking mechanism but should run 360° so as to lock the two housings together.

The metal washers and sleeves can be hardened or soft. Hardening the metal sleeves and washers will improve the wear resistance and lower the coefficient of friction and are, thus, preferred. It should be recognized that the metal washers and sleeves can be unitary in circular dimension or can be split on the diagonal. They can be made in any conventional manner, such as, drawing or welding.

Suitably, the thickness of the rigid sleeves are 0.5 to 1.50 mm.

Suitably, the thickness of the rigid washers are 0.5 to 1.50 mm.

Suitably, the thickness of the sliding bearing is 0.20 to 1.00 mm.

As illustrated in the drawings, the metal sleeves and metal washers can be form fitted into the plastic housings so as to prevent the parts from slipping. Furthermore, gaps within the housings or annulus can be greased to aid in sealing and aiding in the bearing. In addition, it can be seen that greasing will assist in anti corrosion of the metal.

REFERENCE CHARACTERS 10. rod
10'. through hole 11. top mount
12. strut bearing
13. spring coil
14. spring seat
15. rubber isolator
16. dust Boot
17. jounce bumper
18. jounce bumper support cup
19. sliding strut bearing
20. plastic housing
21. upper plastic housing
22. lower plastic housing
23. inner plastic sleeve
24. upper plastic ledge
25. outer plastic sleeve
26. lower plastic ledge
27. bottom seal
28. top seal
29. flanged, cylindrical annulus
30. thrust hollow
31. cylindrical hollow
32. upper thrust washer
33. lower thrust washer
34. synthetic resin sliding thrust washer
35. inner sleeve
36. outer sleeve
37. synthetic resin sliding sleeve
38. inner flanged sleeve
39. outer metal flanged sleeve
40. resin flanged sleeve
41. lower plastic housing
42. spring seat
43. integrated jounce bumper support cup
44. lower plastic housing
45. spring seat
46. upper plastic housing
47. jounce bumper support cup

I claim:

1. A sliding strut bearing comprising:
a plastic housing which has a through hole for accommodating a rod of a strut, the housing having an inner wall which defines the through hole and encircles the rod;
a flanged, cylindrical annulus in the housing, the annulus having a cylindrical hollow axially aligned with the through hole and a thrust hollow extending radially outward from the cylindrical hollow, the thrust hollow in a flanged portion of the annulus, the cylindrical hollow having an inside and outside inner wall which are axially aligned with the through hole, the thrust hollow having a top inner wall that extends radially outward from the inside inner wall and a bottom inner wall that extends radially outward from the outside inner wall;
a inner rigid body abutting the inside and top inner wall;
an outer rigid body abutting the outside and bottom inner wall; and
a synthetic resin sliding bearing body positioned between the inner and outer rigid body.

2. The bearing of claim 1, wherein
the housing comprises:
an upper plastic housing having an inner plastic sleeve for encircling the rod and an upper plastic ledge affixed to and extending radially outward from the inner plastic sleeve;
a lower plastic housing mating, from below, with the upper plastic housing and having an outer plastic sleeve spaced apart and encircling the inner plastic sleeve and a lower plastic ledge affixed to and extending from the outer plastic sleeve, the lower plastic ledge spaced apart from the upper plastic ledge;
a bottom seal formed between a bottom axial edge of the inner plastic sleeve and a bottom axial edge of the outer plastic sleeve;
a top seal formed between an outer radial edge of the upper plastic ledge and an outer radial edge of the lower plastic ledge;
the cylindrical hollow is formed between the inner plastic sleeve and the outer plastic sleeve;
the thrust hollow formed between the upper plastic ledge and the lower plastic ledge;
an inner metal washer means abutting an inner wall of the inner plastic sleeve and an inner wall of the upper plastic ledge and positioned in the annulus.

3. The bearing of claim 1, wherein
the inner rigid body comprises an inner sleeve in the cylindrical hollow, abutting the inside inner wall and axially aligned with the through hole, and a separate upper thrust washer in the thrust hollow, abutting the top inner wall and axially aligned with the through hole;
the outer rigid body comprises an outer sleeve in the cylindrical hollow, abutting the outside inner wall and axially aligned with the through hole, and a separate lower thrust washer in the thrust hollow, abutting the bottom inner wall and axially aligned with the through hole; and
the synthetic resin bearing body comprises a synthetic resin sliding sleeve between the inner and outer sleeve and a separate synthetic resin sliding thrust washer between the upper and lower thrust washer.

4. The bearing of claim 1, wherein
the inner rigid body is a unitary body comprising an inner sleeve in the cylindrical hollow, abutting the inside inner wall and axially aligned with the through hole and an upper thrust washer in the thrust hollow, abutting the top inner wall and the upper thrust washer extending radially outward from the top of the inner sleeve;
the outer rigid body comprises an outer sleeve in the cylindrical housing abutting the outside inner wall and axially aligned with the through hole and a separate lower thrust washer in the thrust hollow abutting the bottom inner wall and axially aligned with the through hole; and
the synthetic resin sliding bearing body is a unitary body comprising a synthetic resin sliding between the inner and outer sleeve and a synthetic resin sliding thrust washer between the upper and lower thrust washer, the synthetic resin sliding thrust washer extending radially outward from the synthetic resin sliding sleeve.

5. The bearing of claim 4, wherein
the synthetic resin sliding bearing body is affixed to the inner rigid body.

6. The bearing of claim 1, wherein
the inner rigid body comprises an inner sleeve in the cylindrical hollow abutting the inside inner wall and axially aligned with the through hole, and a separate upper thrust washer in the thrust hollow, abutting the top inner wall and axially aligned with the through hole;
the outer rigid body is a unitary body comprising an outer sleeve in the cylindrical hollow, abutting the outside inner wall and a lower thrust washer in the thrust hollow, abutting the bottom inner wall, the lower thrust washer extending radially outward from the top of the outer sleeve; and
the synthetic resin sliding bearing body is a unitary body comprising a synthetic resin sliding sleeve between the inner and outer sleeve and a synthetic resin sliding thrust washer between the upper and lower thrust washer, the synthetic resin sliding thrust washer extending radially outward from the synthetic resin sliding sleeve.

7. The bearing of claim 6, wherein
the synthetic resin sliding bearing body is affixed to the outer rigid body.

8. The bearing of claim 1, wherein
the inner rigid body is a unitary body comprising an inner sleeve in the cylindrical hollow, abutting the inside inner wall and axially aligned with the through hole and an upper thrust washer in the thrust hollow, abutting the top inner wall, the upper thrust washer extending radially outward from the top of the inner sleeve;
the outer rigid body is a unitary body comprising an outer sleeve in the cylindrical hollow, abutting the outside inner wall and lower thrust washer in the thrust hollow, abutting the bottom inner wall, the lower thrust washer extending radially outward from the top of the outer sleeve; and
the synthetic resin sliding bearing body is a unitary body comprising a synthetic resin sliding sleeve between the inner and outer sleeve and a synthetic resin sliding thrust washer between the upper and lower thrust washer, the synthetic resin sliding thrust washer extending radially outward from the synthetic resin sliding sleeve.

9. The bearing of claim 8, wherein
the synthetic resin sliding bearing body is affixed to the outer rigid body.

10. The bearing of claim 1, wherein
the synthetic resin is polytetrafluoroethylene (PTFE).

11. The bearing of claim 1, wherein
the rigid body is made of ceramic or metal, and
the metal is steel, aluminum or brass.

12. The bearing of claim 1, wherein
the housing has a spring seat for a spring of the strut on an outer wall of the housing.

13. The bearing of claim 1, wherein
the housing has a jounce bumper support cup affixed to and extending axially downward from an outside wall of the housing.

14. A sliding strut bearing comprising:
a plastic housing which has a through hole for accommodating a rod of a strut 1 the housing having an inner wall which defines the through hole and encircles the rod;
a flanged 1 cylindrical annulus in the housing 1 the annulus having a cylindrical hollow axially aligned with the through hole and a thrust hollow extending radially outward from the cylindrical hollow, the thrust hollow in a flanged portion of the annulus, the cylindrical hollow having an inside and outside inner wall which are axially aligned with the through hole, the thrust hollow having a top inner wall that extends radially outward from the inside inner wall and a bottom inner wall that extends radially outward from the outside inner wall;
an inner rigid body abutting the top inner wall;
an outer rigid body abutting the outside and bottom inner wall; and
a synthetic resin sliding bearing body positioned between the outer rigid body and the inner rigid body and inside inner wall.

15. The bearing of claim 14, wherein
the housing comprises:
an upper plastic housing having an inner plastic sleeve for encircling the strut and an upper plastic ledge affixed to and extending radially outward from the inner plastic sleeve;
a lower plastic housing mating, from below with the upper plastic housing and having an outer plastic sleeve spaced apart and encircling the inner plastic sleeve and a lower plastic ledge affixed to and extending from the outer plastic sleeve I the lower plastic ledge spaced apart from the upper plastic ledge;
a bottom seal formed between a bottom axial edge of the inner plastic sleeve and a bottom axial edge of the outer plastic sleeve;
a top seal formed between an outer radial edge of the upper plastic ledge and an outer radial edge of the lower plastic ledge;
the cylindrical hollow is formed between the inner plastic sleeve and the outer plastic sleeve;
a thrust hollow is formed between the upper plastic ledge and the lower plastic ledge.

* * * * *